United States Patent [19]
Meier

[11] 3,851,976
[45] Dec. 3, 1974

[54] METHOD FOR DETERMINING THE TRANSLUCENCY AND/OR TURBIDITY OF A MEDIUM AND APPARATUS FOR APPLYING THE METHOD

[76] Inventor: Johann Meier, Casa Clarissa, CH-6645 Brione sopra Minusio, Switzerland

[22] Filed: Jan. 24, 1973

[21] Appl. No.: 326,171

[30] Foreign Application Priority Data
Jan. 26, 1972  Switzerland.......................... 1113/72
Aug. 18, 1972  Switzerland........................ 12248/72

[52] U.S. Cl.................... 356/206, 250/575, 356/208
[51] Int. Cl. .......................................... G01n 21/26
[58] Field of Search ........... 250/218, 573, 574, 576; 356/201, 204–206, 208

[56] References Cited
UNITED STATES PATENTS

| | | | |
|---|---|---|---|
| 2,324,304 | 7/1943 | Katzman............................. | 356/208 |
| 2,394,129 | 2/1946 | West.................................... | 356/208 |
| 2,427,013 | 9/1947 | MacAdams........................ | 250/218 X |
| 3,319,514 | 5/1967 | McAllister......................... | 250/218 X |
| 3,617,757 | 11/1971 | Burr et al.......................... | 356/208 X |

*Primary Examiner*—John K. Corbin
*Assistant Examiner*—F. L. Evans
*Attorney, Agent, or Firm*—Oblon, Fischer, Spivak, McClelland & Maier

[57] ABSTRACT

The translucency or turbidity of a medium is determined by passing a first beam of light from a single light source through it, converting the intensity of the beam to an electrical voltage by means of a photoelectric cell and then converting the voltage into a corresponding frequency. A reference beam undergoes a similar conversion and the resulting frequency is compared with that obtained for the first beam, so that the translucency or turbidity can be found.

10 Claims, 5 Drawing Figures

METHOD FOR DETERMINING THE TRANSLUCENCY AND/OR TURBIDITY OF A MEDIUM AND APPARATUS FOR APPLYING THE METHOD

The invention relates to a method of determining the translucency and/or turbidity of a medium and apparatus for applying this method.

A turbidity monitoring device is already known, wherein a measuring beam and a comparison beam are generated by means of a light source and of a mirror oscillating several hundred times per second. The measuring beam is aimed into the substance to be measured, wherein a diffused light is generated by the presence of clouding particles, and the intensity of the diffused light is measured by means of a photoelectric cell. The comparison beam is then directed through a calibrated standard turbidity reference unit and then through the substance to be measured, at the photoelectric cell. A measuring shutter situated in the path of the comparison beam then has its screening action adjusted until the light intensity of the comparison beam is equal to the light intensity of the diffuse light produced in the substance to be measured by means of the measuring beam, at the mensuration point of the photoelectric cell. A scalar drum coupled to the measuring shutter or screen then provides a reading for the turbidity. This apparatus has the disadvantages that its structure is complex since it comprises a very rapidly pivotable mirror and an adjustable measuring shutter, that it requires a greater number of standard turbidity reference units for insertion therein, whereof the selection must be accomplished experimentally, and that the intensity of the diffuse light produced by means of the measuring beam depends on the nature of the surface of the clouding particles, which however has no effect on the comparison beam.

According to the invention there is provided a method of determining the translucency of a medium, wherein two separately extending beams are produced by means of a single source of radiation, of which one is projected through the medium which is to be measured, the intensity of radiation at the end of each of the two beam paths being converted into a corresponding electrical voltage in each case, the latter being each converted into a corresponding frequency, the two frequencies obtained in this manner then being compared with each other.

Further according to the invention there is provided a method of determining the turbidity of medium by means of rays reflected in the latter, wherein two separately extending beams are produced by means of a single source of radiation, of which one is projected through the medium which is to be measured, the intensity of radiation of the rays reflected within the medium which is to be measured and the intensity of radiation at the end of the second beam path each being converted into a corresponding electrical voltage and the latter each being converted into a corresponding frequency, the two frequencies obtained in this manner then being compared with each other.

Still further according to the invention there is provided apparatus for performing the said method and comprising method of determining the translucency of a medium, wherein two separately extending beams are produced by means of a single source of radiation, of which one is projected through the medium which is to be measured, the intensity of radiation at the end of each of the two beam paths being converted into a corresponding electrical voltage in each case, the latter being each converted into a corresponding frequency, the two frequencies obtained in this manner then being compared with each other.

For measuring the turbidity of a medium by means of beams reflected within the same, it is advantageous to produce two separately extending beam paths by means of a single source of radiation, of which one is directed through the medium to be measured, to convert the radiation intensity of the rays reflected in the medium to be measured and the radiation intensity at the end of the second beam path into a corresponding electrical voltage in each case and the latter into a corresponding frequency in each case, and to compare the two frequencies thus obtained with each other.

It is appropriate for the frequency corresponding to the beam which is projected through the medium to be measured, to be fed to a first decadic counter unit and to store the resulting counter reading in a memory unit, to feed the frequency corresponding to the other beam to a second decadic counter unit which, upon reaching a definite reading, triggers the memory unit so that the reading of the first counter unit is displayed on a digitial indicator and the counter units are reset to zero. In this connection, it is advantageous for the memory unit allocated for display of the numerical position stored therein in a digital indicator to be triggered when the numerical reading of the first decadic counter unit corresponds to 100 percent translucency.

It is appropriate for the voltage-frequency converter coordinated with the beam projected through the medium to be measured to be connected electrically to a first decadic counter unit and for the latter to be connected electrically to a memory unit, and that the voltage-frequency converter coordinated with the other beam be connected electrically to a second decadic counter unit and that the latter be coupled to the memory unit in such manner that, upon reaching a definite numerical position, it triggers the memory unit and produces the result that the numerical position of the first counter unit is visibly displayed in a digital indicator connected to the memory unit.

For elimination of disturbing influences in case of temperature fluctuations, it is advantageous for the components situated in the two beam paths to be identically formed and arranged.

To perform turbidity measurements, in rivers, lakes or clarifying plants, it is appropriate for the source of radiation employed to consist of a light source which is housed- together with the beam receptors and the voltage-frequency converters — in a liquid-tight case which is joined to a rod-shaped element for lowering of the apparatus into a liquid which is to be checked, and that the comparison circuit equipped with the digital indicator be arranged in an unit not intended to be immersed into the liquid, and be connected electrically by means of electrical conductors to the electrical part of the apparatus which is situated within the case.

The invention will be further described, by way of example only, and not by way of limitation, with reference to the accompanying drawings, In these:

Figure 1:
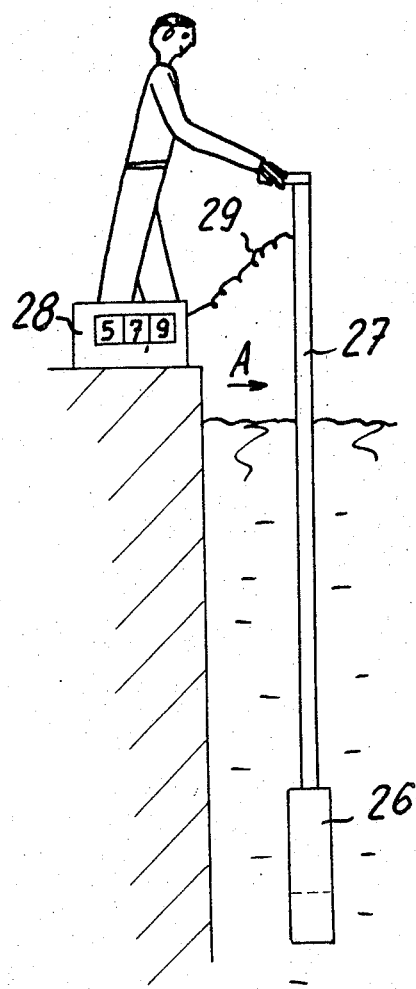
FIG. 1 shows a sideview of apparatus constituting an embodiment of the invention, for determining the turbidity of a liquid, as for example, the water of a lake, river or clarifying plant.
Figure 2:
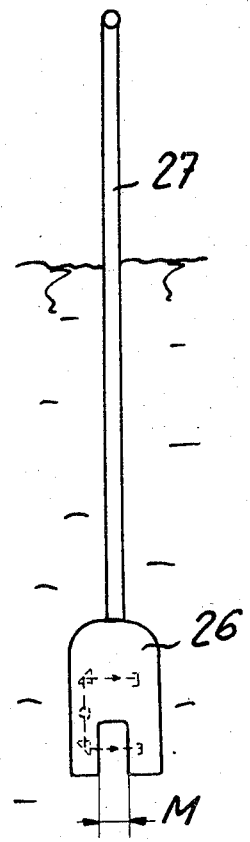
FIG. 2 shows a view in the direction of the arrow A in FIG. 1.
Figure 3:
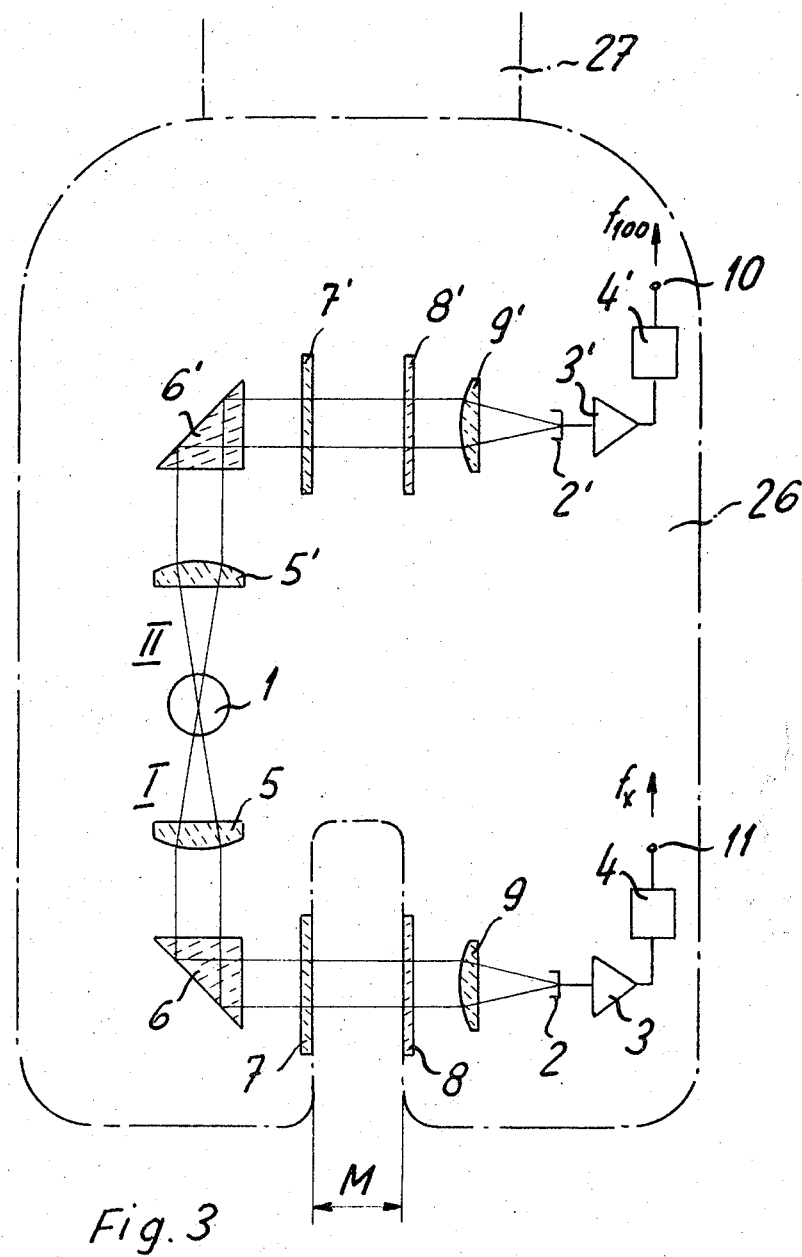
Figure 4:
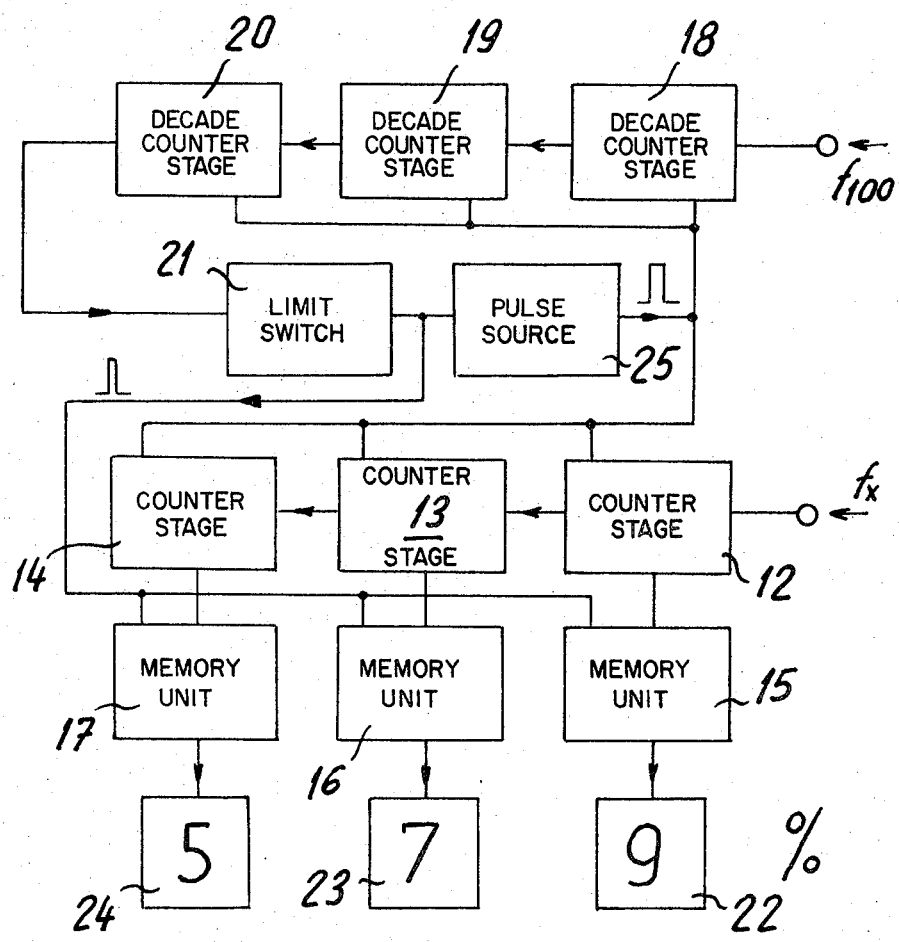
Figure 5:
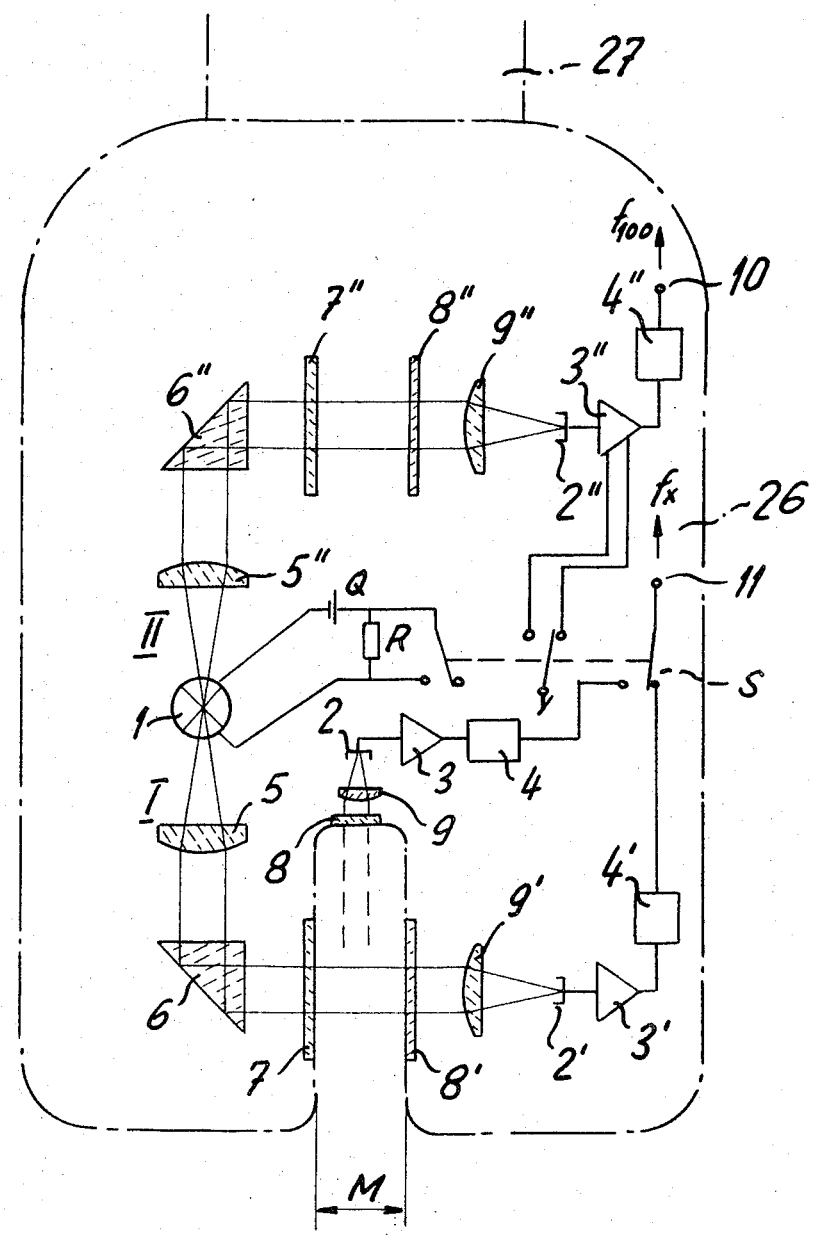

FIGS. 3 and 4 diagrammatically show some parts of the apparatus illustrated in FIGS. 1 and 2, and FIG. 5 diagrammatically shows some parts of apparatus constituting another embodiment of the invention.

The apparatus for determining the turbidity in a liquid, as for example in the water of a lake, river or clarifying plant, illustrated in FIGS. 1 to 4, has a source of radiation 1 consisting of an incandescent bulb, FIGS. 3 and 4, for generating two separate beams I and II. At the end of each beam is situated a respective photoelectric cell 2, 2' for generating an electrical voltage corresponding to the incident light intensity in each case, which is connected electrically through one of the amplifiers 3, 3' to one of the voltage-frequency converters 4 and 4' in each case, for generating a frequency corresponding to the voltage fed in, in each case.

To establish identical optical conditions for the measuring beam I and the reference beam II, the components situated in the two beam baths, such as the collective lenses 5 and 5', the prisms 6' and 6'', the windows 7, 7' and 8, 8', the condenser lenses 9 and 9' and the photoelectric cells 2' and 2'', are identically formed and arranged. The measurement volume M within which is situated the liquid to be measured, is between the windows 7 and 8 positioned in the measuring beam path I. The windows 7'' and 8'' situated in the reference beam path II are merely intended to establish symmetry and delimit a reference column having a permeability T of 100 percent or an absorption factor of 0 percent. Whilst measuring the turbidity in a coloured liquid, the windows 7' and/or 8' situated in the reference beam path II may be replaced by appropriate colour compensation filters.

The light incident on the photoelectric cells 2 and 2' produces electrical currents, which correspond to the light intensities and are amplified separately in amplifiers 3 and 3''. The measured value voltage and the reference value voltage fed to the corresponding voltage-frequency converters 4 and 4' produce corresponding frequencies $f_x$ and $f_{100}$ as the output of the former.

The permeability or translucency of the reference volume (T=100 percent) thus corresponds to the reference frequency $F_{100}$ appearing at the output terminal 10, whereas that of the measurement volume ($T_x$) correspond to the measurement frequency $f_x$ at the output terminal 11, in which connection $f_x = 0$ if $T_x = 0$ and
$f_x = f_{100}$ if $T_x = T_{100} = 100$ percent.

This equalization ($f_x = f_{100}$ if $T_x = 100$ percent), is obtained with a single adjustment of the optical elements and of the amplifiers 3 and 3'.

As apparent from FIG. 4, frequency $f_x$ corresponding to the value to be measured is fed to three decadic counter stages 12, 13, and 14. The numerical reading is stored in the corresponding memory units 15, 16 and 17. The reference frequency $f_{100}$ is similarly fed to three decadic counter stages 18, 19 and 20.

After the maximum reading 100.0 has been reached in the counter formed by the counter stages 12, 13 and 14, the limit switch 21 feeds a transmission pulse to the memory units 15, 16, and 17. The reading stored is thereby transferred to the corresponding numerical indicators 22, 23 and 24.

A source of pulses 25 triggers by the limit switch 21 moreover causes zero reset or cancellation of all counter stages, so that both frequencies $f_x$ and $f_{100}$ are counted again starting from nought. The numerical value apparent on the numerical indicators 22, 23 and 24 corresponds to the translucency of the measurement volume M.

The measurement sequence m amounts to:

$m = f_{100}/1,000$ measurements/sec.

For example: $f_{100} = 2,500$ c/s, if 2.5 measurements are performed per second.

As apparent from FIGS. 1, 2 and 3, the light source 1, together with the optical elements 5, 5', 6, 6', 9 and 9', the windows 7, 7', 8 and 8' the condenser lenses 9 and 9', the photoelectric cells 2 and 2', the amplifiers 3 and 3' and the voltage-frequency converters 4 and 4', is housed in a bifurcated liquid-tight case 26 which is joined to a rod-like element 27 for the lowering of the apparatus into the liquid which is to be checked. The comparison circuit (FIG. 4) equipped with the digital indicator system, is housed in a part 28 which should not be immersed in the liquid, and is connected electrically by means of electrical conductors 29 to the electrical part of the apparatus situated in the case 26.

The frequency-dependent data allow of trouble-free geometrical separation of the measuring part from the indicating part, since no voltage drops need be taken into account even in the case of long connecting leads between these two parts.

It is evidently also possible to construct this apparatus as a stationary device and to place the liquid to be measured, e.g., within a glass vessel, in the measurement space M. To allow for the absorption of light by the glass vessel employed for this purpose, an identical empty glass vessel may be placed in the reference volume.

In the case of coated material, if a measurement is to be made whilst eliminating the effect of the coating, an identical coating may be positioned in the reference volume so that the influence of the coating of the coated material present in the measurement volume is not included in the result appearing in the digital indicator system 22, 23, 24.

If another source of radiation is employed instead of a light source, it is then also possible for example, to determine the thickness of an opaque workpiece placed in the measurement volume M from the drop in radiation intensity.

The embodiment of FIG. 5, of apparatus for determining the turbidity in a liquid, as for example in the water of a lake, river or clarifying plant, by means of transmission and dispersion, comprises a source of radiation 1 consisting of an incandescent bulb, for generation of two separately extending beams 1 and 11. A part of the light projected into the water to be tested, impinges in the form of diffused light on a photoelectric cell 2 at which a diffused light measurement is performed. In the example illustrated, a complementary photoelectric cell 2' is incorporated moreover for measuring the translucency of the water to be measured. A photoelectric cell 2'' is situated at the end of the reference beam path II. The photoelectric cells 2, 2' and 2'' situated at the extremities of the corresponding beam paths serve the purpose of generating an electrical voltage corresponding to one of the incident light intensities in each case, and are connected electrically through the corresponding amplifiers 3, 3' and 3'' to the voltage frequency converters 4, 4' and 4'' in each case, for generation of a frequency corresponding in each case to the voltages fed in. The switch S is employed to switch over from a diffused light measurement to a transmission measurement.

To establish identical optical conditions for the measuring beam I and the reference beam II in the case of a transmission measurement, the components situated in the two beam paths, such as the collective lenses 5' and 5'', the prisms 6' and 6'', the windows 7' and 7'' and 8', 8'', the condenser lenses 9' and 9'', and the photoelectric cells 2' and 2'', are identically formed and arranged. The measurement volume M within which is placed the liquid to be measured, in the case of transmission measurement, is situated between the windows 7 and 8' arranged in the measurement beam path I. The windows 7'' and 8'' in the reference beam path II are employed solely to establish symmetry and delimit a reference volume having a translucency T of 100 percent or an absorptivity of 0 percent.

When measuring the turbidity of a coloured liquid, the windows 7'' and/or 8'' situated in the reference beam path II may be replaced by corresponding color compensation filters.

The light fluxes incident on the respective photoelectric cells 2, 2' and 2'', generate electrical currents in these, which correspond to the light intensities and are separately amplified in respective amplifiers 3, 3' and 3''. The voltage corresponding to the value to be measured and the voltage corresponding to the reference value fed to respective voltage-frequency converters 4, 4' and 4'' generate corresponding respective frequencies $f_x$, $f_{100}$ at the output terminals of the former.

The translucency of the reference volume (T = 100 percent) thus corresponds to the reference frequency $f_{100}$ appearing at the output terminal 10, that of the measurement volume ($T_x$) corresponds to the measurement frequency $f_x$ at the output terminal 11, so:

$f_x = 0$ when $T_x = 0$ and
$f_x = f_{100}$ when $T_x = T_{100} = 100$ percent.

This equalization ($f_x = f_{100}$ when $T_x = 100$ percent) is obtained by a single adjustment of the optical elements and of the amplifiers 3' and 3''. An analogous equalization is performed in the case of 100 percent reflection by adjustment of the optical elements and of the amplifier 3.

The evaluation of the measuring value frequency $f_x$ and of the reference frequency $f_{100}$ is performed as already described with reference to FIG. 4.

I claim:

1. A method for determining the transparency of a medium comprising the steps of:
   producing a first and second light beam from a single light source;
   passing said first light beam through said medium;
   converting first and second light beams to first and second analog voltages proportional to light beam intensity;
   converting said first and second analog voltages to first and second corresponding analog frequencies, the frequency corresponding to said first light beam being applied to a first decade counter to obtain a first count, the frequency corresponding to said second light beam being applied to a second decade counter to obtain a second count;
   storing said first count in a storage unit;
   disconnecting said storage unit when said second decade counter reaches a preset count;
   resetting said decade counters; and
   displaying said first count at a time of disconnecting of said storage unit.

2. A method as in claim 1 further including the step of:
   positioning a color compensating filter in a path of said second light beam so that the transparency of a colored medium in a path of said first light beam can be determined.

3. A method as in claim 1 further including the step of compensating said second light beam for a stratification or sheathing of said medium.

4. A method as in claim 1 wherein the step of displaying said first count occurs when the count of said second decade counter corresponds to a 100 percent transparency of said medium.

5. A method as in claim 1 wherein said medium is a solid.

6. A method as in claim 1 wherein said medium is a liquid.

7. A method as in claim 1 wherein said medium is a gas.

8. A method as in claim 6 wherein said liquid is water.

9. An apparatus for determining the transparency of a medium comprising:
   a light source for producing first and second light beams, only said first light beam being passed through said medium;
   first and second photodetectors at an end of each light beam to produce a voltage corresponding to the intensity of each respective light beam incident thereon;
   first and second voltage-to-frequency converters correspondingly connected to each photodetector;
   first and second decade counters correspondingly connected to said first and second voltage-to-frequency converters;
   a storage unit connected to said first voltage-to-frequency converter;
   a comparator circuit means for disconnecting said storage unit when said second decade counter reaches a preset count; and
   means for digitally displaying a count in said first decade counter when said storage unit is disconnected.

10. An apparatus as in claim 9 wherein said light source, said photodetectors and said voltage-to-frequency converters are enclosed in a submergible housing portion, said submergible housing portion being attached to a housing submerging means; said comparator circuit means and said digital display means being enclosed in a non-submergible housing portion, said submergible and non-submergible housing portions being electrically interconnected.

* * * * *